(12) United States Patent
Schaffer (10) Patent No.: US 8,641,306 B2
(45) Date of Patent: Feb. 4, 2014

(54) WRISTWATCH KEYBOARD

(75) Inventor: Mark Schaffer, Rockaway, NJ (US)

(73) Assignee: Argotext, Rockaway, NJ (US)

(*) Notice: Subject to any disclaimer, the term of this patent is extended or adjusted under 35 U.S.C. 154(b) by 251 days.

(21) Appl. No.: 13/210,457

(22) Filed: Aug. 16, 2011

(65) Prior Publication Data
US 2013/0045037 A1 Feb. 21, 2013

(51) Int. Cl.
*B41J 5/28* (2006.01)
*G04B 47/00* (2006.01)

(52) U.S. Cl.
USPC .............................. 400/477; 368/10; 368/281

(58) Field of Classification Search
USPC .......................................................... 400/477
See application file for complete search history.

(56) References Cited

U.S. PATENT DOCUMENTS

| | | | |
|---|---|---|---|
| 4,032,931 A * | 6/1977 | Haker | 341/23 |
| 4,139,837 A | 2/1979 | Liljenwall | |
| 4,395,134 A * | 7/1983 | Luce | 368/3 |
| 4,847,818 A | 7/1989 | Olsen | |
| 5,974,000 A * | 10/1999 | Pfeil | 368/10 |
| 6,188,648 B1 * | 2/2001 | Olsen | 368/281 |
| 6,286,064 B1 | 9/2001 | King | |
| 6,597,345 B2 | 7/2003 | Hirshberg | |
| 7,145,554 B2 | 12/2006 | Bachmann | |
| 7,170,496 B2 | 1/2007 | Middleton | |
| 7,209,114 B2 | 4/2007 | Radley-Smith | |
| 7,286,063 B2 | 10/2007 | Gauthey | |
| 7,495,585 B2 * | 2/2009 | Vainio et al. | 341/34 |
| 7,548,231 B1 | 6/2009 | Goren | |
| 7,598,890 B2 * | 10/2009 | Park et al. | 341/22 |
| 7,791,587 B2 | 9/2010 | Kosugi | |
| 7,932,892 B2 | 4/2011 | Chen | |
| 8,194,040 B2 * | 6/2012 | Knighton | 345/169 |
| 2002/0041784 A1 * | 4/2002 | Thomas | 400/472 |
| 2002/0145946 A1 * | 10/2002 | Meylan et al. | 368/281 |
| 2003/0151982 A1 * | 8/2003 | Brewer et al. | 368/46 |
| 2005/0042012 A1 * | 2/2005 | Ward et al. | 400/481 |
| 2005/0113940 A1 * | 5/2005 | Frenkel et al. | 700/14 |
| 2005/0249046 A1 * | 11/2005 | Gueissaz et al. | 368/160 |
| 2006/0077073 A1 | 4/2006 | Chen | |
| 2006/0092177 A1 | 5/2006 | Blasko | |
| 2009/0199130 A1 | 8/2009 | Tsern | |
| 2010/0128570 A1 * | 5/2010 | Smith et al. | 368/10 |
| 2010/0245246 A1 | 9/2010 | Rosenfeld | |

* cited by examiner

*Primary Examiner* — Nguyen Ha
(74) *Attorney, Agent, or Firm* — Frommer Lawrence & Haug LLP; Stephen J. Lieb (57) ABSTRACT

The present invention discloses a data entry device to be worn on a person's wrist, similar to a wrist watch. Dimples are arrayed around the periphery of a digital display on the device. The dimples provide both a locating means for finger placement and a boundary for sensing the shift of a pressure point within, the shift in a preferred direction indicating a selection from a displayed menu to be made by lifting the finger from contact. A novel way of holding the device by its wrist band while fingering the dimples leads to a fluid method of keying functionalities for use as a phone and as an internet-enabled device.

18 Claims, 5 Drawing Sheets

WRISTWATCH KEYBOARD

FIELD OF THE INVENTION

This invention relates to data input devices, and more particularly to a keyboard device worn on the wrist.

BACKGROUND OF THE INVENTION

The miniaturization of electronic devices has increasingly made them more portable and convenient to carry. Wireless devices, such as cell phones, are now carried in pockets and purses, an accessory item as indispensible as wallets and keys. Smartphones, served by portable operating systems and software "Apps", have taken over substantial functionality from laptop computers, which had mobilized desk-bound computers in an earlier generation of technology. The ultimate goal of the miniaturization process is to produce a multi-functional device, capable of both voice and data communication, which is as wearable as a watch and as user-friendly as the input device called a mouse.

While technological advances have greatly reduced the size of electronic displays, manual data entry still carries demands for finger-sized layouts. Phone keypads reduce the number of keys over the standard QWERTY keyboard, but they inconvenience the user by requiring multiple keystrokes to enter text. Touch screen technology has moved the keyboard onto the display itself, but accuracy with finger control still requires a certain amount of territorial separation. The mechanical keys may be eliminated, but the display area, not the size, is the beneficiary of the displaced space. One method of reducing the input area on the display is to use a stylus to pinpoint the touch zone. Unfortunately, small implements tend to get lost and are almost never at hand when needed. Reducing the keyboard to the size of a wristwatch, without taxing the user with keystroke repetition or auxiliary equipment, requires an innovative approach.

U.S. Pat. No. 4,847,818 to Olsen teaches placing mechanical keys on the face of a watch. Such positioning, however, leaves little room for displaying information. Chen, in U.S. Patent Application 2006/0077073, places the mechanical keys around the periphery of the watch casing and on shoulders adjacent to the watch face. This arrangement removes the competition for display space. In both instances, however, the minimal separation distance required for accurate finger placement essentially limits the functionality to a phone keypad. Moreover, pushing buttons with one finger is a slow data entry mode, and, with the device bound to one wrist, there is likely to be some awkwardness in the positioning of the hands, not to mention fatigue over an extended session.

Operating a QWERTY keyboard on a small scale requires a multi-functional key with selection capability. Such a multi-functional key would eliminate the one-to-one correspondence of keys and functions and result in a reduced keyboard layout. Hirshberg, in U.S. Pat. No. 6,597,345, discloses a solution by making sliding finger contact on a touch screen in one of several detectable directions. The touch zone, combined the trace direction, indicates a discreet selection when the touch is lifted. Thus, one key, effectively, can facilitate four to six functions. While the number of keys may be reduced, the area of the contact zone for each key, nevertheless, must be of a certain size in order to discriminate directional movement. The discrimination is further complicated by a tendency, when sliding over a smooth surface without tactile boundaries, to encroach into neighboring contact zones. A touch screen on a watch face would be far too small to implement such a technique.

There is an unfilled need for QWERTY keyboard functionality on the scale of a wristwatch. Such a device could be the next multi-functional, internet-linked, App-enabled, Smartphone. Such functionality might require, for example, a multiplicity of selection options from a relatively few, narrowly-fenced, touch zones around a watch face periphery. It might also require, to match the convenience and speed of legacy keyboards, a fluidity of keystroke entry from hand positions comfortably arranged for long-term tasking. The instant invention provides novel solutions in both apparatus and is method to meet this need.

SUMMARY OF THE INVENTION

It is accordingly an object of the present invention to provide a data entry device for wrist deployment. It is a further object to enter data on said device by means of touch interaction with one or more fingers. It is a further object to locate controls on the side surfaces of the device in order to optimize the display of information on the facing surface of the device. It is a further object to provide a means for precisely locating the focal point of a touch zone. It is a further object to provide multiple selections for functionality at each touch control. It is a further object to provide said multiple selections by sensing the movement of a pressure point in a preferred direction within the zone. It is a further object to facilitate bounding the pressure point movements. It is a further object to provide means and method for comfortably holding and manipulating the device. It is a further object to utilize multiple fingers, in a simultaneous or sequential touch mode, to make the data entry a more fluid process. It is a further object to expand the library of functionalities by sequencing touches.

These objects, and others to become hereinafter apparent, are embodied in a data entry device for wrist deployment comprising, in a first part, a wrist-sized housing having a top surface and four side surfaces forming a periphery there around; in a second part, a digital display on the top surface; in a third part, a wrist-band connected to two opposing side surfaces, the wrist band functioning to removably attach the housing to a person's wrist; in a fourth part, at least one panel on each of the two remaining, unbanded, side surfaces; in a fifth part, at least two dimples on each panel, each dimple configured to receive the touch of a finger-tip, each dimple enabled with sensor technology to respond to finger-tip pressure toward one of at least two preferred directions in the plane of the panel; and, in a sixth part, a programmable processor coupled with memory resident in the housing, the processor in signal communication with the sensor technology and the digital display and programmed to associate each dimple with a stored menu and each preferred direction with a functionality. With the data entry device configured with these parts, and with the thumb and index fingers of each hand hovering over the unbanded side surfaces, a functionality can be selected by touching at least one of the dimples with one of the hovering fingers to cause a menu to be displayed by the integrated processor on the digital display and thereafter urging the touching finger toward one of the preferred directions as indicated by the menu.

In a preferred embodiment, the data entry device further comprises two additional panels on chamfered surfaces with the side panels, the additional panels and one side panel each having three dimples thereon enabled with sensor technology. The nine dimple locations would be mimicked in a grid area of the digital display, wherein each cell of the grid to would display alphabet characters corresponding to available selections from the corresponding dimple. The alphabet characters would be distributed among the cells in rough correspondence to a QWERTY keyboard layout. Another area of the display would show the entries made by the selections of individual characters resulting from directional pressure manipulation at an active dimple before touch is released there from.

In an alternate embodiment, a method of entering data comprises, in a first step, providing the data entry device as described above to the wrist of a person to be omnipresent; in a second step, removing the data entry device from the wrist; in a third step, holding the data entry device in a reading position with at least one of the middle, ring or little fingers of each hand gripping the wrist-band from both sides, whereby the index fingers and thumbs can be deployed to hover over the at least one panel; in a fourth step, touching at least one dimple with a thumb or index finger to cause a menu of functionality choices to appear on the display; in a fifth step, selecting one of the choices by urging the touching finger or thumb in one of the preferred directions indicated by the menu; and, in a last step, entering the selection by releasing the touch.

In a particular alternate embodiment, the providing step is enhanced with a timer to discriminate simultaneity with respect to two-finger touches. With the index finger and thumb deployed in a clamp-like manner for closing upon two dimples on opposite sides of the device, the range of key-able functionality can be greatly expanded by simultaneous or sequential dual touches. The expansion would enable use of the device for sophisticated applications, such as for Apps, internet browsing, or picture-taking.

As this is not intended to be an exhaustive recitation, other embodiments may be learned from practicing the invention or may otherwise become apparent to those skilled in the art.

DESCRIPTION OF THE DRAWINGS

Various other objects, features and attendant advantages of the present invention will become fully appreciated as the same becomes better understood through the accompanying drawings, in which like reference characters designate the same or similar parts throughout the several views, and wherein.

DETAILED DESCRIPTION OF THE PREFERRED EMBODIMENT

For the purposes of definition, the term "functionality", as used herein, may be taken to mean either an item chosen for data entry or a scripted action programmed to be performed by the system. The term "selection", as used herein, will be taken to mean the indication of a menu choice through the manipulation of contact in a zone of touch sensitivity. The term "enter", as used herein, will be taken to mean an order to execute the selection, either by entry into a data field or by initiating an action, through the withdrawal of intimate contact from the zone.

Figure 1:
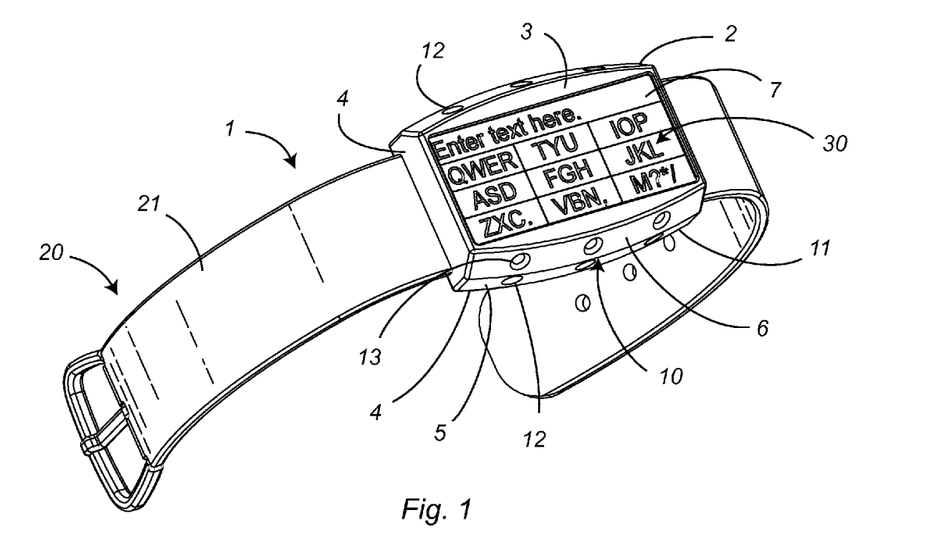
FIG. 1 is a perspective view of the data entry device of the present invention.

Referring to FIG. 1, a data entry device 1 for wrist deployment comprises a housing 2. The housing 2 has a top surface 3 and four side surfaces 4 forming a periphery around the top surface 3. A wrist band 21 is connected to housing 2 at two opposite side surfaces 4. The wrist band 21 provides a means to removably carry the data entry device 1 on a persons' wrist, and thus makes the device omnipresent in much the same manner as a wrist watch. The remaining two side surfaces 4 are unbanded side surfaces 5 which flank the top surface 3. A digital display 7 occupies the top surface 3. The wrist band 21 is an integral part of a means for holding 20 the data entry device 1. The unbanded side surfaces 5 are an integral part of a means for entering data 10 into the data entry device 1. The digital display 7 is an integral part of a means for handling information 30 in the data entry device 1.

The means for entering data 10 comprises at least one panel 11 on at least one of the side surfaces 5. Each panel 11 comprises at least two dimples 12. The at least two dimples 12 reflects an operational symmetry of two hands, as will be discussed hereinafter. The panel 11 may be a flat surface, but preferably is a curvilinear surface. Such a surface provides additional spacing for the dimples 12. The dimples 12 are debossments, as opposed to embossments, in the surface of the panel 11. Each dimple 12 is bounded by a dimple edge 13, which can be square or polygonal but which is preferably circular in shape. The circumference of the dimple edge 13 is such that a finger or thumb of a person's hand can find a tactile registration to the dimple 12. In a preferred embodiment, the dimple diameter is approximately 0.200 of an inch. Additional panels 11 can be added by creating more side surfaces 5. One way to do this is to chamfer the edge between the side surfaces and the top surface to create a chamfer surface 6. In a preferred embodiment, two more panels 11, positioned on chamfer surfaces 6 in flanking positions to the digital display 7, are added to the at least one side surface panel 11. Each of the three panels 11 are provided with three dimples each, bringing the total to nine dimples. The configuration of nine dimples reflects correspondence with a QWERTY keyboard, as will be discussed hereinafter.

Figure 6:
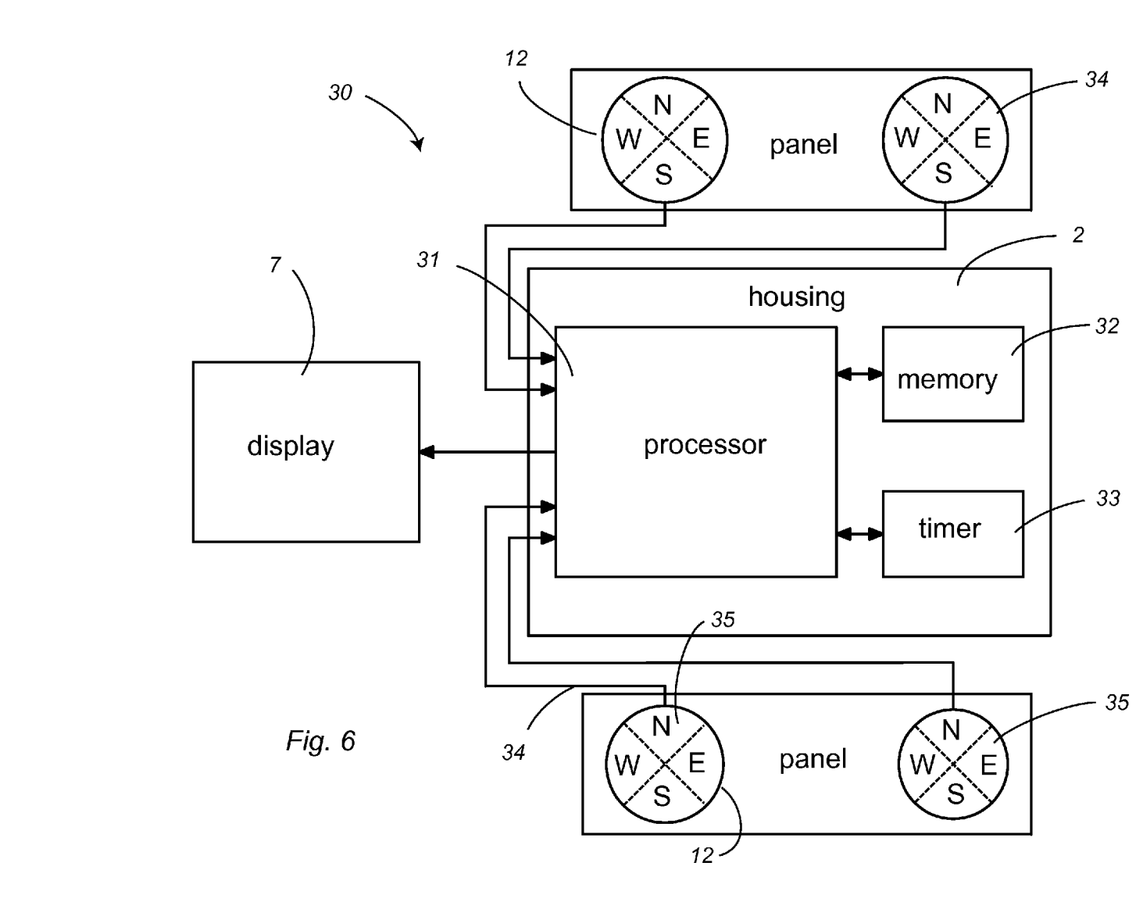
FIG. 6 is a system diagram of the data entry device.

The means for entering data 10 cooperates with the digital display 7 and the means for handing information 30. Referring to FIG. 6, the means for handling information 30 is comprised of a programmable processor 31 located in the housing 2. The programmable processor 31 is coupled with memory 32. The programmable processor 31 is in signal communication with the digital display 7. The processor is also in signal communication with sensor technology 34 located at the site of each dimple 12. In the preferred embodiment, a timer 33, in signal communication with the processor 31, is included in the housing configuration. The sensor technology 34 is sensitive to the application of finger pressure in and around the dimple site. The zone of sensitivity can be divided into sectors 35 which define preferred directions 14 and the boundaries thereof. In the preferred embodiment, there are four sectors 35 arrayed orthogonally. The four sectors 35 are arbitrarily named, for purposes of discussion herein, North, South, East and West. When the dimple 12 is initially touched, a locus point is registered by the sensor technology 34. When the finger is urged in a North, South, East or West direction, the sensor technology 34 detects a directional path leading from the locus toward one or another of the "compass" directions. Each dimple 12, because of its configuration as a recess, provides a seat for the touching finger. The finger, more or less, is held in place by the seat, the dimple edge 13 providing a boundary to prevent the finger from sliding into a neighboring sector 35. The planes of adjacent panels 11, intersecting at the chamfer angle, also prevent inadvertent sector contact. Thus, the novel configuration of the dimple 12, not to mention the angular separation of the panels, improves upon prior art touch zones. The prior art, unlike the case with dimple 12, is deficient the means to fence-in directional movements.

Figure 3:
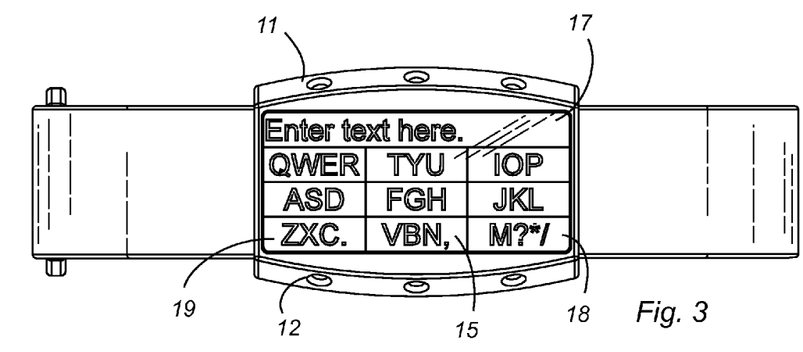
FIG. 3 is a plan view of the data entry device showing a data entry screen.
Figure 4:
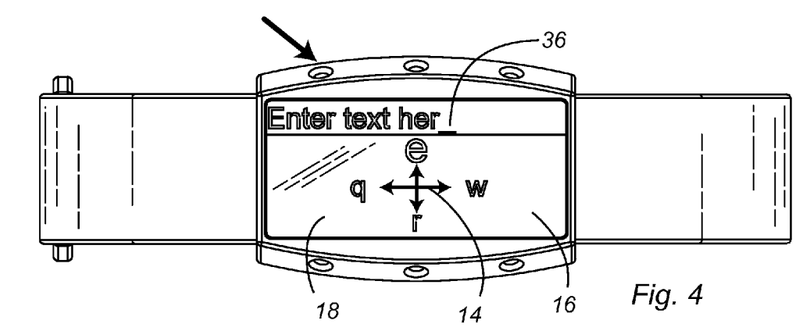
FIG. 4 is a plan view of the data entry device showing a sub-menu for the selection "qwer"

Referring to FIGS. 3 and 4, the digital display 7, in a home state prior to a touch event, displays an entry part 17 and a grid part 18. The grid part 18 displays a menu 15 of choices arranged in cells 19. The cells 19 are positioned to correspond with the positions of the dimples 12. For example, the top left cell 19 corresponds to the dimple 12 located on the top panel 11 in the left position. In the preferred embodiment, there are 9 cells 19 in three rows corresponding to the three panels 11. The 26 letters of the alphabet can be distributed among the cells and rows to roughly correspond to the standard QWERTY keyboard. Since most keyboard users are familiar with this layout, locating a particular alpha character of interest is facilitated in this way. For the purpose of discussion herein, the top left dimple will be referred to as number 1, and the set of dimples will correspond by number labels 1-9 with the grid positions in left to right and top to bottom order. When the number 1 dimple 12, for example, is touched, a sub-menu 16 will appear in the grid part 18, as shown in FIG. 4. The sub-menu 16 will show the characters in the corresponding cell in a spatial relationship indicating the preferred directions 14. The preferred directions 14 may also be indicated by arrows pointing outward from a center corresponding to the locus of the touch event. In the preferred embodiment, there are up to four preferred directions 14 corresponding to North, South, East and West. When the number 1 dimple is touched, for example, the letter characters "q", "w", "e" and "r" are displayed in the West, East, North and South directions, respectively. When the touch is urged toward the North direction, the letter "e" is changed in response to confirm its selection. The response can be a change in color, a bolding, or simply an enlargement of the character, as shown in FIG. 4. When the touch is withdrawn from the number 1 dimple, the selected character is entered in the entry part 17 of the display. A cursor 36 indicates the position for entry of the selected character.

Figure 2:
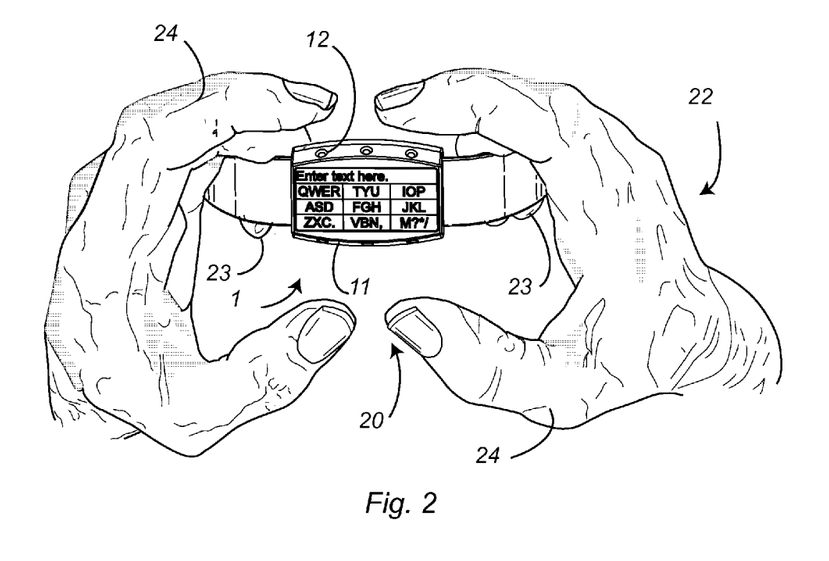
FIG. 2 is a perspective view of the hand and finger positions for holding the data entry device.

Referring to FIG. 2, the means for holding 20 involves both hands of the user. The data entry device 1 is removed from the wrist and oriented for viewing the digital display 7, typically with the wrist band 21 extending left and right. The wrist band 21 is held in both hands by holding fingers 23. By definition, the holding fingers 23 are the middle, ring and little fingers of the hand. The wrist band 21 may be of a clasp type wherein the band separates into two parts, or may be of a bracelet type. Either type configures a closed or open loop into which the holding fingers, in opposite postures, can be curled to support the data entry device 1 in a readable position. A hand hold 22 configured in this manner leaves working fingers 24 available to initiate touches on the dimples 12. By definition, the working fingers 24 are the thumb and index finger of each hand. The working fingers 24 are placed by the grip of the holding fingers 23 in a position to hover over the panels 11. The bi-lateral pairs of working fingers 24 can also operate in cooperative gestures, like a clamp or "pincher", to touch two, or even more, dimples in an event. The hand hold 22 is a natural position for the hands, with the wrists relaxed, and the working fingers 24 suspended for easy articulation. This novel posture for the hands not only makes up to four fingers available for the efficient and dexterous manipulation of the data entry device 1, the posture can be maintained without fatigue or discomfort for long periods during extended data entry sessions.

The working fingers 24 preferably operate either singly or doubly. While other operational modes are possible, with up to four fingers at a time in a single event, the one or two touch mode offers an ample multiplicity of functionality with a minimum of operational complexity. Two touches at a time can be either simultaneous or sequential, as determinable by the timer 33 and a programmed preferred delay 37 (not shown). In the preferred embodiment, the preferred delay 37 is 1-2 seconds, and this can be adjustable for speed and sensitivity purposes. In the preferred embodiment, the two adjacent panels 11 are oriented to the thumb side. Users accustomed to texting will find thumb entry to be more natural, so the preponderance of dimples is allocated to thumb entry. A typical two-touch maneuver might be with the index finger of one hand touching dimple numbers 1-3 and the corresponding thumb, in a pincher action, ranging over numbers 4-9. The number of pincher touches is 18 for nine dimples. The number of permutations of two-finger touches taken in sequence is 72. The number of both simultaneous and sequential touches possible is 108. When combined with the 9 single touches offering up to 36 selections, a large library is functionalities can be accessed with either one or two touches.

Figure 5:
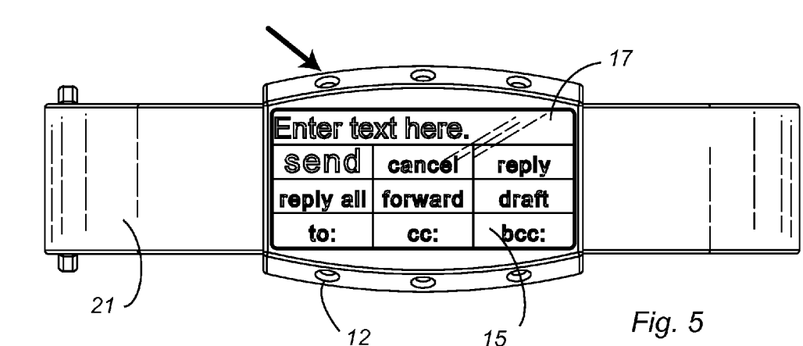
FIG. 5 is a plan view of the data entry device showing a function menu.
Figure 8:
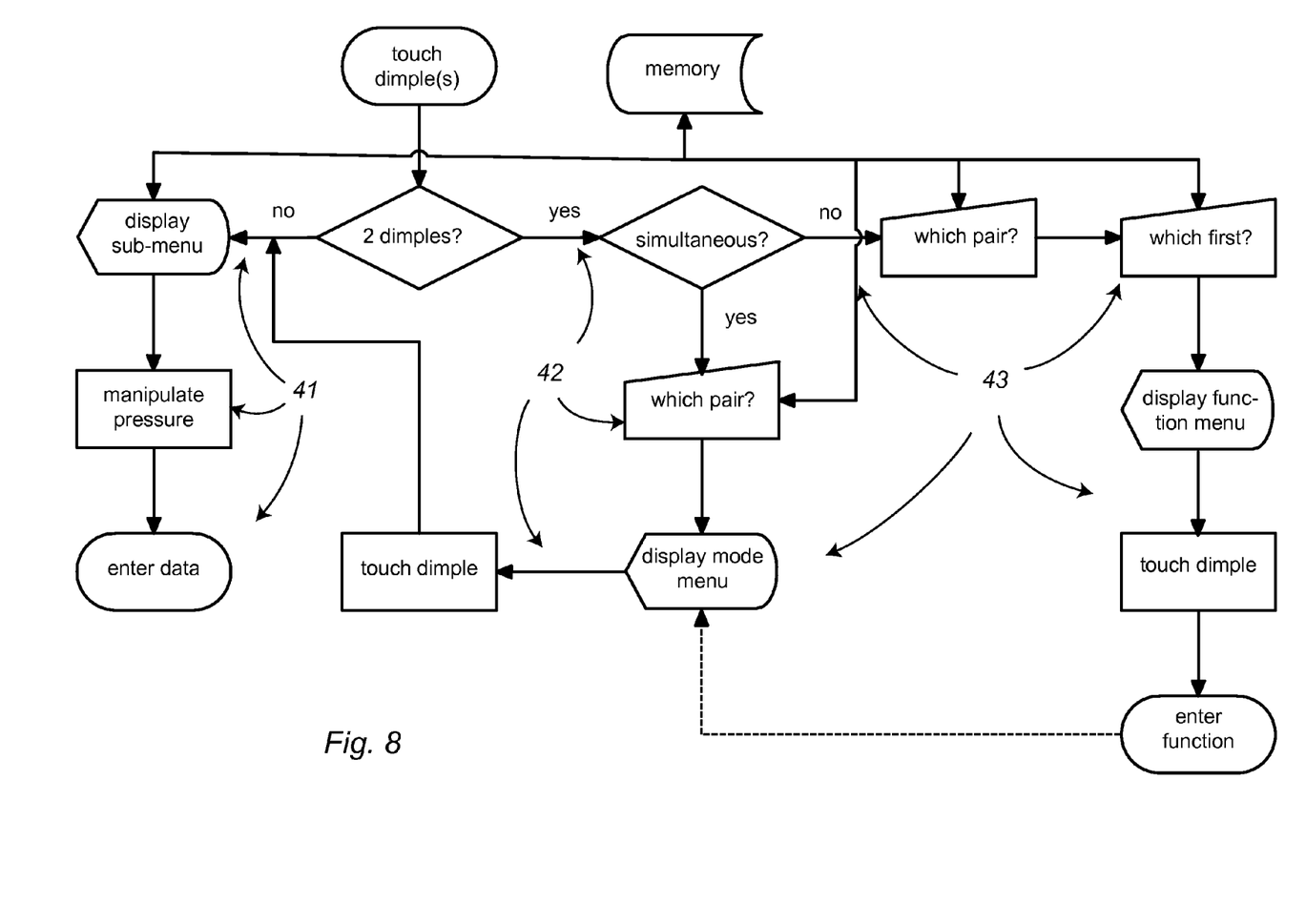
FIG. 8 is a flow diagram showing logic sequences in selecting functions and data.

While many schemes for assigning functionalities to touch events are possible, one exemplary scheme 40 will be discussed here below, referring to FIG. 8. Exemplary scheme 40 is comprised of decision points and paths leading from decision resolution by the processor 31, enabled by sensory input from sensor technology 34 and stored data in memory 32. Each path begins with a touch event and ends with an entry event. Exemplary scheme 40 is comprised of a data entry path 41, a mode entry path 42 and a function entry path 43. Data entry path 41 begins with a single dimple touch and leads to the data entry scenario described above, through the display of the sub-menu 16, a pressure manipulation in a preferred direction 14, and a command to enter with the release of the touch. For data entry path 41, the release must occur from a shifted pressure point. If pressure is returned to the locus, the selection is thereby nullified. Mode path 42 begins with a two-dimple touch and leads to the decision that the touch is simultaneous. Typically, this type of touch will be with a pincher manipulation, and the path thereafter proceeds to an analysis of which of 18 pairs is indicated. A data entry mode is assigned to each pair, each mode exhibiting a different menu 15 in the grid part 18 of the digital display 7. Data entry modes may be, but are not necessarily limited to, upper case alpha, lower case alpha, numerals, and one or more symbol or character sets. After display of the particular menu 15, mode path 42 proceeds along data entry path 41 by returning to a single touch entry. Function path 43 begins with a two-dimple touch and leads to the decision that the touch is sequential. Function path 43 then proceeds to an analysis of which of 36 pairs is indicated and which of the indicated pair is first in sequence, the field involving 72 permutations in all. A different menu 15 is assigned to each pair of the function path 43. A typical function menu is shown in FIG. 5, which illustrates, by example, functions related to email processing. In cells 1-6, the functionalities are actions which are triggered by touching and releasing the corresponding dimple. The contact will cause recognition of the selection by some visual means, as discussed above, and as shown in cell 1. In cells 7-9, however, additional data entry is indicated. Touching one of those cells will loop into the data entry path 41, as indicated by the dotted-line arrow in FIG. 8.

With function entry path 43, a single touch to a dimple 12 is more efficient than manipulating directionally though a sub-menu 16. In the case of data entry, however, because of the multiplicity of selections, it is more efficient to operate through the sub-menus 16 of the data entry path 41 rather than toggling through an extended library of menus 15 in the mode entry path 42. In like manner, simultaneous touching is quicker than sequential touching and, therefore, data entry is facilitated by implementing the simultaneous protocol for the mode entry path 42. Each of the beneficial features mentioned herein, including the dimples 12, the particular configuration of the panels 11, the hand hold 22, the organization of the cells 19 into a QWERTY layout, the working fingers 24 and the configuration of the different paths of the exemplary scheme 40, add to a fluidity of data entry processing unknown and as yet under-achieved in the art of miniature input devices.

Figure 7:
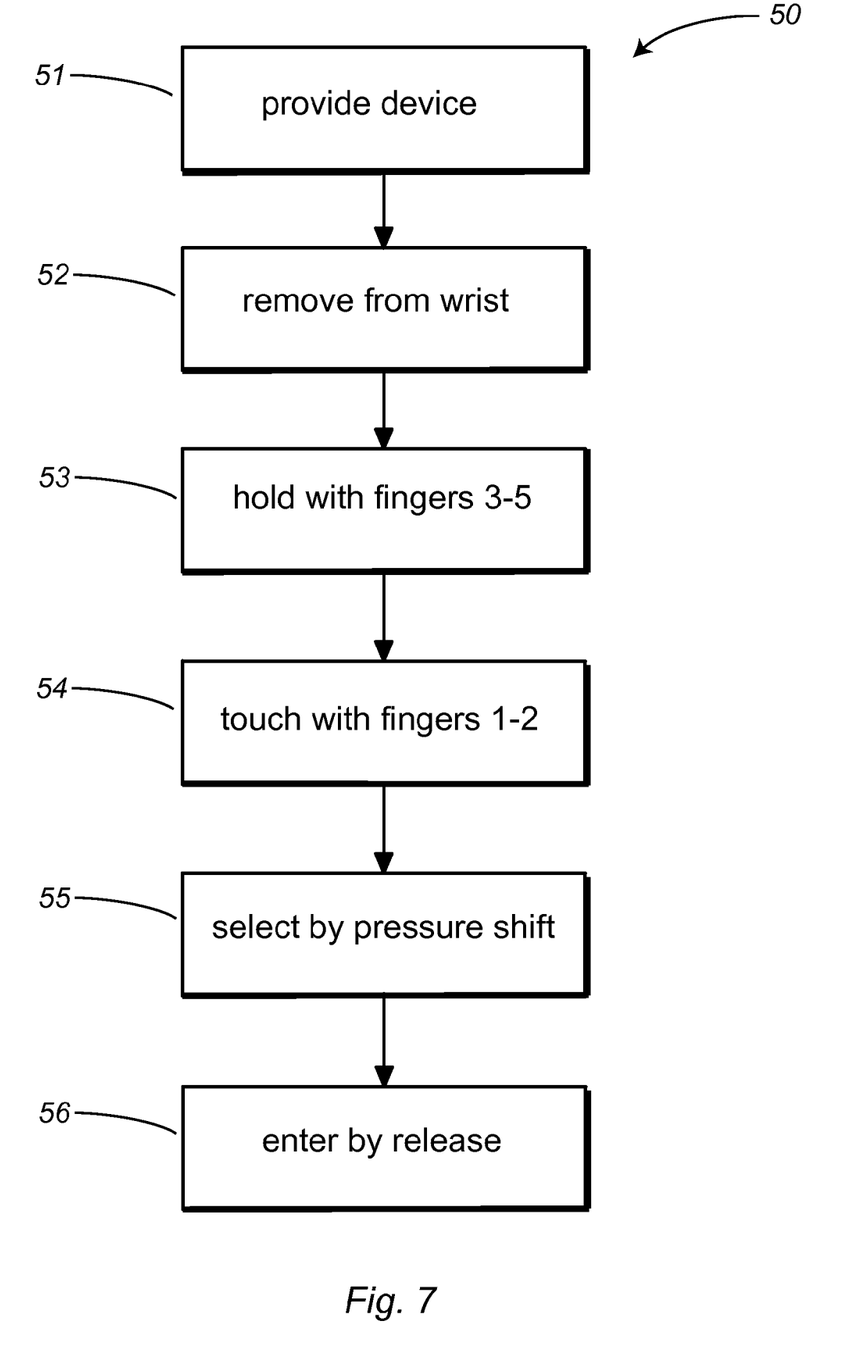
FIG. 7 is a process diagram showing a method of entering data on the data entry device.

An alternate embodiment of the present invention comprises a method of entering data 50 by means of wrist deployment, as shown in FIG. 7. The method of entering data 50 comprises the steps of:

51, providing the data entry device 1 to the wrist of a person for omnipresent use;

52, removing the data entry device 1 from the wrist;

53, holding the data entry device in a readable position with at least one of the holding fingers 23 gripping the wrist band 21 from both sides, whereby the working fingers 24 are deployed to hover over the at least one panel 11;

54, touching at least one dimple 12 with a working finger 24 to cause a menu 15, or a sub-menu 16, of functionality choices to appear on the display 7;

55, selecting one of the choices by urging the operative working finger 24 in one of the preferred directions 14 indicated by the sub-menu 16; and 56, entering the selection by releasing the touch.

In a particular alternate embodiment, the touching step 53 comprises simultaneous or sequential touches by the working fingers 24. A simultaneous touch toggles between data entry modes including lower case alpha, upper case alpha, number and character. The sequential touch results in a functional menu 15 according to both the position and sequence of the touches. A functionality is thereafter selected and entered through another touch.

It is to be understood that the invention is not limited in its application to the details of construction, to the arrangements of the components and to the method of using set forth in the preceding description or illustrated in the drawings. For example, dimples can be added to the fourth panel for a further expansion of functionalities. Also, it is to be understood that the phraseology and terminology employed herein are for the purpose of the description and should not be regarded as limiting.

What is claimed is:

1. A data entry device for wrist deployment, comprising:
a wrist-sized housing having a top surface and four side surfaces forming a periphery there around;
a digital display on the top surface;
a wrist-band connected to two opposing side surfaces, the wrist band functioning to removably attach the housing to a person's wrist;
at least two panels on each of the two remaining, unbanded, side surfaces;
at least two dimples on each panel, each dimple configured to receive the touch of a finger-tip, each dimple enabled with sensor technology to respond to finger-tip pressure toward one of at least two preferred directions in the plane of the panel; and
a programmable processor coupled with memory inside the housing, the processor in signal communication with the sensor technology and the digital display and programmed to associate each dimple with a stored menu and each preferred direction with a functionality;
whereas, with the thumb and index fingers of each hand hovering over the unbanded side surfaces, a functionality can be selected by touching at least one of the dimples with one of the hovering fingers to cause a menu to be displayed by the integrated processor on the digital display and thereafter urging the touching finger toward one of the preferred directions as indicated by the menu and
wherein the at least two panels are in stacked configuration, on each of the two unhanded side surfaces, the panels angularly disposed to each other in side pairs and to the display upon which they flank.

2. The data entry device of claim 1, wherein each top stacked panel and one of the lower panels each have three dimples.

3. The data entry device of claim 2, wherein the display in a home state is divided into an entry part and a grid part, the entry part displaying the current selections, the grid part associating, by a layout of cells in correspondence to the nine dimple positions, each of the dimples with a sub-menu indicating selections available by touching said dimple, the layout of cells in rows and positioning of alphabet in cells corresponding to a QWERTY keyboard, the home state in display when no touching occurs.

4. The data entry device of claim 1, further comprising a timer inside the housing in signal communication with the sensor technology and the processor.

5. The data entry device of claim 4, wherein a timed sequence of finger touches is determined by the timer and the processor is programmed to associate different functionalities with different sequences.

6. The data entry device of claim 5, wherein the functionality is selected by a pincher movement of the thumb and index finger.

7. The data entry device of claim 1, wherein the selected functionality is executed by a release of the touch.

8. The data entry device of claim 1, wherein the functionality results in the selection of a letter, number or character to be entered in a data field in the display.

9. The data entry device of claim 1, wherein the functionality results in an operational command.

10. The data entry device of claim 1, wherein there are four preferred directions arrayed orthogonally.

11. A data entry device for wrist deployment, comprising:
a wrist-sized housing having a top surface and four side surfaces forming a periphery there around;
a digital display on the top surface;
a wrist-band connected to two opposing side surfaces, the wrist band functioning to removably attach the housing to a person's wrist;
at least one panel on each of the two remaining, unbanded, side surfaces;
at least two dimples on each panel, each dimple configured to receive the touch of a finger-tip, each dimple enabled with sensor technology to respond to finger-tip pressure toward one of at least two preferred directions in the plane of the panel; and
a programmable processor coupled with memory inside the housing, the processor in signal communication with the sensor technology and the digital display and programmed to associate each dimple with a stored menu and each preferred direction with a functionality;

whereas, with the thumb and index fingers of each hand hovering over the unbanded side surfaces, a functionality can be selected by touching at least one of the dimples with one of the hovering fingers to cause a menu to be displayed by the integrated processor on the digital display and thereafter urging the touching finger toward one of the preferred directions as indicated by the menu wherein the display in a home state is divided into an entry part and a grid part, the entry part displaying the current selections, the grid part associating, by a layout of cells in correspondence to the dimple positions, each dimple with a sub-menu indicating selections available by touching said dimple, the home state in display when no touching occurs.

12. A method of entering data by means of wrist deployment, comprising the steps:

providing to the wrist of a person for omnipresence a data entry device comprising a wrist-sized housing having a top surface and four side surfaces forming a periphery there around; a digital display on the top surface; a wrist-band connected to two opposing side surfaces, the wrist band functioning to removably attach the housing to the wrist; at least two panels in stacked configuration on each of the two remaining, unbanded, side surfaces, the panels angularly disposed to each other in side pairs and to the display upon which they flank; at least two dimples on each panel, each dimple configured to receive the touch of a finger-tip, each dimple enabled with sensor technology to respond to finger-tip pressure toward one of at least two preferred directions in the plane of the panel; and a programmable processor coupled with memory and located inside the housing, the processor in signal communication with the sensor technology and the digital display and programmed to associate each dimple with a stored menu and each preferred direction with a functionality;

removing the data entry device from the wrist;

holding the data entry device in a reading position with at least one of the middle, ring or little fingers of each hand gripping the wrist-band from both sides, whereby the index fingers and thumbs are deployed to hover over the at least one panel;

touching at least one dimple with a thumb or index finger to cause a menu of selection choices to appear on the display;

selecting one of the choices by urging the touching finger or thumb in one of the preferred directions indicated by the menu; and entering the selection by releasing the touch.

13. The method of claim 12, wherein the touching step comprises touches by both the index finger and thumb of at least one hand.

14. The method of claim 13, wherein the touches are determined to be simultaneous or sequential according to a preferred timer delay.

15. The method of claim 14, wherein a simultaneous touch toggles between data entry modes.

16. The method claim 15, wherein data entry include lower case alpha, upper case alpha, number, and character.

17. The method of claim 14, wherein a sequential touch results in the display of a menu of functions assignable to dimple positions.

18. A data entry device for wrist deployment, comprising:

a wrist-sized housing having a top surface and side surfaces forming a periphery there around;

a wrist-band connected to two opposing side surfaces, the wrist band functioning to removably attach the housing to a person's wrist;

at least two panels in stacked configuration, on each of two unbanded opposing side surfaces, the panels angularly disposed to each other in side pairs and to the display upon which they flank;

at least two sensors on each panel, each sensors configured to receive the touch of a finger-tip, each sensor enabled with sensor technology to respond to finger-tip pressure toward one of at least two preferred directions in the plane of the panel; and a programmable processor coupled with memory inside the housing, the processor in signal communication with the sensor technology and programmed to associate each sensor with a stored menu and each preferred direction with a functionality;

whereas, with at least one of the person's fingers hovering over the panels, a functionality can be selected by touching at least one of the sensors with one of the hovering fingers to cause the integrated processor to retrieve the stored menu and thereafter urging the touching finger toward one of the preferred directions to cause the integrated processor to perform the functionality associated with the direction.

* * * * *